(12) United States Patent
Wiesmayer

(10) Patent No.: US 9,630,350 B2
(45) Date of Patent: Apr. 25, 2017

(54) MOLDED INSERT FOR A MOLDED PART MOLD, METHOD FOR PRODUCING A MOLDED PART AND MOLDED PART

(76) Inventor: Otto Wiesmayer, Neustadt/Donau (DE)

( * ) Notice: Subject to any disclaimer, the term of this patent is extended or adjusted under 35 U.S.C. 154(b) by 0 days.

(21) Appl. No.: 13/376,011

(22) PCT Filed: Jun. 2, 2010

(86) PCT No.: PCT/DE2010/000613
§ 371 (c)(1),
(2), (4) Date: Jan. 17, 2012

(87) PCT Pub. No.: WO2010/139307
PCT Pub. Date: Dec. 9, 2010

(65) Prior Publication Data
US 2012/0128909 A1  May 24, 2012

(30) Foreign Application Priority Data

Jun. 3, 2009 (DE) .................. 10 2009 023 684
Mar. 4, 2010 (DE) .................. 10 2010 010 330

(51) Int. Cl.
*B29C 45/26* (2006.01)
*B29C 45/40* (2006.01)
(Continued)

(52) U.S. Cl.
CPC .............. *B29C 44/58* (2013.01); *B29C 33/42* (2013.01); *B29C 33/3857* (2013.01);
(Continued)

(58) Field of Classification Search
CPC ... B29C 45/37; B29C 45/372; B29C 33/3857; B29C 33/3892; B29C 33/42; B29C 33/565; B29C 44/58; Y10T 428/1376
(Continued)

(56) References Cited

U.S. PATENT DOCUMENTS 2,714,228 A * 8/1955 Davis .............................. 19/260
3,756,553 A * 9/1973 Ranz .............................. 249/142
(Continued)

FOREIGN PATENT DOCUMENTS

CN  1302726 A   7/2001
CN  101400495 A  4/2009
(Continued)

OTHER PUBLICATIONS

International Search Report dated Dec. 1, 2010 for PCT/DE2010/000613.
(Continued)

*Primary Examiner* — Seyed Masoud Malekzadeh
(74) *Attorney, Agent, or Firm* — Ohlandt, Greeley, Ruggiero & Perle, L.L.P.

(57) ABSTRACT

In order to produce molded foam parts from foam systems, such as soft, semi-hard and integral foam, foaming molds are typically used, which are produced from different base materials, depending on the intended purpose and required output or service life. Molds for producing molded foam parts are produced from steel or aluminum. A negative or undesirable property during the production of molded foam parts is that the foam adheres to the foaming molds and can often only be removed mechanically. In order to prevent this, the disclosure proposes a mold insert for a molded part mold, comprising a cavity, wherein the mold insert can be arranged on the molded part mold such that a volume-reduced cavity is formed in the arranged state and the mold insert contributes to creating the shape of the material.

8 Claims, 6 Drawing Sheets

(51) Int. Cl.
  *B29C 44/58* (2006.01)
  *B29C 33/42* (2006.01)
  *B29C 33/38* (2006.01)
  *B29C 45/37* (2006.01)
  *B29C 33/56* (2006.01)

(52) U.S. Cl.
  CPC ........ *B29C 33/3892* (2013.01); *B29C 33/565* (2013.01); *B29C 45/37* (2013.01); *Y10T 428/1376* (2015.01)

(58) Field of Classification Search
  USPC ......... 264/41, 45.1, 45.5, 51, 313, 316, 318, 264/202, 328.7, 496; 425/190, 192 R, 425/556, 577, 588, 470; 249/184, 114.1
  See application file for complete search history.

(56) References Cited

U.S. PATENT DOCUMENTS

| | | | | |
|---|---|---|---|---|
| 4,447,372 A | * | 5/1984 | Kreuttner | 264/2.2 |
| 4,544,518 A | * | 10/1985 | Lindskog | 264/257 |
| 5,013,228 A | * | 5/1991 | Thornthwaite et al. | 425/2 |
| 5,435,960 A | * | 7/1995 | Bressler et al. | 264/221 |
| 5,702,735 A | * | 12/1997 | Martin et al. | 425/548 |
| 5,750,060 A | * | 5/1998 | Maus et al. | 264/40.5 |
| 5,861,114 A | * | 1/1999 | Roffman et al. | 264/2.5 |
| 6,045,732 A | * | 4/2000 | Nakatsuji et al. | 264/46.4 |
| 6,238,197 B1 | * | 5/2001 | Van Hout et al. | 425/168 |
| 6,361,309 B1 | * | 3/2002 | Burzynski et al. | 425/577 |
| 6,649,121 B1 | * | 11/2003 | Hamamoto et al. | 264/513 |
| 7,192,543 B2 | * | 3/2007 | Malfliet et al. | 264/45.5 |
| 7,717,697 B2 | * | 5/2010 | Hutchinson et al. | 425/552 |
| 7,833,462 B2 | * | 11/2010 | Hoogland | 264/328.7 |
| 2006/0255512 A1 | * | 11/2006 | Joyner | 264/496 |
| 2007/0063386 A1 | * | 3/2007 | Seaver | 264/328.7 |
| 2009/0220809 A1 | * | 9/2009 | Bertheol et al. | 428/542.8 |

FOREIGN PATENT DOCUMENTS

| | | |
|---|---|---|
| DE | 2 263 584 | 9/1973 |
| DE | 102007022327 A1 | 11/2008 |
| EP | 1190828 A1 | 3/2002 |
| EP | 1 995 033 A1 | 11/2008 |
| EP | 1995030 A2 | 11/2008 |
| GB | 1414465 A | 11/1975 |

OTHER PUBLICATIONS

European Search Report dated Aug. 14, 2015, with translation, from corresponding European Patent Application No. 15000933.0, 16 pages.

* cited by examiner

MOLDED INSERT FOR A MOLDED PART MOLD, METHOD FOR PRODUCING A MOLDED PART AND MOLDED PART

BACKGROUND

1. Field of the Disclosure

The disclosure relates to a mold insert for a molded part mold, more specifically a foam mold or galvano-mold, with an upper part and a matching lower part, with a cavity, more specifically a hollow, wherein the molded part mold impresses a shape onto a material, more specifically a foam, that is introduced into the cavity. The disclosure furthermore relates to a method for manufacturing a molded part and to a molded part.

2. Discussion of the Background Art

In order to manufacture molded foam parts from foam systems, such as soft, semi-hard, hard and integral foam, foaming molds are typically used, which are manufactured from different base materials, depending on the intended use and required output or service life. Plastic material, plastic casting resins or plastic plates are used for instance for prototype or pre-series molds, whereas molds made of aluminum and/or steel are used for production runs, respectively for production of great quantities and complex parts.

These molds mostly consist of a lower shell and an upper shell which are connected by lateral hinges. When closed, both "halves" form a desired hollow space which is also called a cavity and which forms the required molded part.

Slides and inserts or the like, which are inserted and actuated manually, semi automatically and automatically, are used for demolding "undercuts", ribs and the like. When the mold is open and/or closed, a prepared foam system is introduced into the cavity by means of a gating system via a mixing head.

A negative or undesirable property of the aforementioned systems is that the foam adheres to the aluminum or steel of the foaming molds and can often only be removed mechanically.

In order not to damage the parts during demolding, respectively to be able to remove them intact, diverse release agents are used. These release agents prevent an "adhesion" of the foam parts to the surface of the molds. Wax-based release agents, which are liquefied by means of solvents in order to be applied with a spray pistol or a brush, are mostly used.

These release agents must be applied before each cycle. In doing so the solvent evaporates and the wax leaves a relatively thin layer on the surface of the mold.

This is an independent process which must be stable in order to ensure an unchanging quality of the parts. The release agents are usually applied manually at the foaming plant by a worker by means of a spray pistol and the produced spray and release agent vapors must be aspirated.

Due to the repeated addition of the release layer, a thickening wax layer forms more specifically on the smaller radiuses or on the ribs, which must be regularly removed.

The application of the release layer as well as the regular removal of the wax residue represents a great time and cost expenditure, associated with a repeated interruption of the production process.

A thin release layer also remains on the foam parts themselves. This layer is only unproblematic when the part does not have to be processed any further, i.e. when it is a finished part.

However, should the foam parts be subsequently laminated, this layer of release agent residue makes it more difficult to glue the laminating material onto the foam. The lamination is carried out for instance with a leather or a foil. Thus, the foam part must be cleaned before lamination.

The described release agents are also used in the manufacture of spray skin or deep-drawn foil. So-called galvano-molds are frequently used for manufacturing spray skins and deep-drawn foils. Surfaces for door coverings, instrument panels or center consoles for instance are manufactured by means of these galvano-molds.

Two-part polyurethane systems for instance are sprayed onto these galvano-molds. A skin is thereby formed, the thickness of which varies depending on the applied quantity and which is removed from the mold after a corresponding reaction time. As explained above, release agents, which are applied either manually or automatically, must be used in order to be able to demold or remove the produced skin.

The spray skins thus manufactured are frequently under-foamed with a support resulting in more complex components. To this end, it is also necessary to ensure that the spray skin is freed of any release agents.

Another disadvantage is that galvano-molds are very expensive to manufacture. Amongst other reasons, this is due to the fact that these molds are frequently impressed with a surface grain, which is supposed to impress the skin to be manufactured with a leather-type surface grain for instance. Even the slightest touch by a worker may destroy such a galvano-mold.

Molded foam parts are furthermore frequently covered in so-called coatings. Such a coating is a protection layer. Without this protection layer, the surfaces of molded foam parts tend to pale and to become brittle when exposed to UV-light. The protection layer prevents the exposure to UV-light for instance by absorbing the UV-light.

Coatings can be varnishes for instance, which are added to foam molds before the foaming processes and subsequently homogeneously bond with the foam. After demolding, the foam is then practically covered with the "coat". The reject rate with molded foam parts covered in coating is relatively high and can amount to up to 30%. For a clean demolding, release agents must also be used.

In the manufacture of carpets, such as are used for instance in vehicle construction, the back side of the carpet—mostly a thermally preformed carpet—is provided with a relatively thin-walled foam layer. The aim of this measure is to increase foot comfort, to absorb tolerances, to prevent fraying and to achieve sound insulation. In order to be able to remove this extensive foam skin from the tool after the reaction time, a thin-walled foil, which has been thermoformed beforehand, is usually placed on the corresponding tool side as a release medium and disposed of after stripping. This process is costly in terms of labor and costs.

The object of the disclosure is to improve the prior art.

SUMMARY

The object is solved by a mold insert for a molded part mold, more specifically a foam mold or galvano-mold, with an upper part and a matching lower part, with a cavity, more specifically a hollow, wherein the molded part mold impresses a shape onto a material, more specifically a foam, that is introduced in the cavity, wherein the mold insert is adapted to be disposed on the molded part mold in such a manner that in the disposed state, a cavity with a reduced volume is formed and the mold insert contributes to impressing the material.

Thus, a speedy exchange of the actual forming cavity can be ensured.

Furthermore, by removing the mold insert from the molded part mold, it is possible to wait for the reaction time to run out while already manufacturing the next foam part by means of mold inserts newly introduced into the molded part mold.

The following terms must be explained:

The "molded part mold" is a conventionally manufactured molded part mold, for instance made of aluminum or steel, which is usually used for manufacturing a molded part. The molded part mold more specifically includes a "foam mold" with an upper part and a matching lower part. Thereby, the upper and lower part can be separated in order to remove a molded part. Foams which reproduce the shape formed by the upper part and the lower part can furthermore be injected into the closed foam mold, thus forming the molded foam part.

The molded part mold can furthermore be configured as a galvano-mold. The galvano-mold can also have an upper part and a matching lower part, merely an upper part or a lower part being usually used. Thin formations such as skins can be manufactured with galvano-molds. Particularly high quality skins are produced by slightly etching the galvano-molds, so that it has a so-called grain. In this manner, skins having a leather-type surface structure for instance can be manufactured.

The "mold insert" can completely fill the molded part mold or only cover parts of the molded part mold. In the end, the mold insert can be a plate or any other substantial object which is demolded together with the molded part.

The "cavity" is a hollow space formed by the molded part mold. In this context, in a one-piece molded part mold, it is more specifically referred to as "hollow". The cavity and the hollow have in common that when introducing a material, such as a foam for instance, the shape of the cavity or of the hollow is reproduced by the material.

The "introduced material" is more specifically a liquid or foamed material, which forms a solid body through a hardening process. For instance, the material can be a plastic foam, more specifically a soft, semi-hard, hard and/or integral foam. Epoxy resins can also be used as introduced material. Impregnated fibers such as fiber mats impregnated with epoxy resin (prepregs) which harden in the cavity, can also be introduced. Powdery materials such as those used in a slush molding method for instance are also included.

In this context, "adapted to be disposed" means more specifically that the mold insert is adapted to the molded part mold in such a manner that the molded part mold receives the mold insert and that the molded part to be manufactured can be manufactured by means of the mold insert. A form-fit disposition is preferred, so that the molded part mold can act uniformly on the mold insert.

In order to manufacture molded parts without release agents, a surface of the mold insert matching the volume-reduced cavities can have a slight or no interfacial tension. The interfacial tension must thereby be determined by the introduced material as well as the material of the matching surface. The slight interfacial tension applies more specifically to steel and aluminum which form the surface of a conventional molded part mold.

Since the quantitative values of the interfacial tension depend on the system, which interacts with the surface, it is sufficient if for this specific system, the above condition is met. More specifically with the "foam" system, it is important that when the foam is hardened, the interfacial tension between the hardened foam and the surface of the mold insert be lower than with aluminum or steel.

The literature often refers to a surface tension instead of an interfacial tension. In the following, these terms must be considered as synonyms.

Since merely the material property of the surface of the mold insert is significant with regard to being free of a release agent, the surface of the mold insert related to the volume reducing cavity can be coated.

In another embodiment, the surface of the mold insert related to the volume reducing cavity is formed by a plastic material. Thus, material alternatives to aluminum and steel can be proposed.

Slight interfacial surface tensions or interfacial tensions can be achieved by forming the surface of the mold insert matching the volume-reducing cavity with a polyolefin, more specifically with polyethylene.

In another embodiment, the mold insert has a temperature conducting element which is more specifically made of metal. The temperature gradient of the material in the mold insert relative to the actual molded part mold made of aluminum or steel for instance, can be increased or reduced by means of this temperature conducting element. Thus it is possible to heat the material in the mold insert as well as to efficiently cool the material in the mold insert. Metals with good heat conducting properties are preferably used, though other heat conductors or insulators can also be used.

In order to also ensure a good temperature conductivity of the mold insert, the thickness of the material of the mold insert can amount to between 0.8 mm and 8 mm and most preferably approximately 2.5 mm. It is thereby particularly advantageous for heat conductivity to use very low material thicknesses.

In another embodiment the mold insert is manufactured as an injection molded part. In this manner, mold inserts can be manufactured in great numbers, thus considerably reducing costs.

In order to ensure a defined fixation and a defined loosening of the mold insert into or from the molded part mold, the mold insert can have a fastening element which allows a detachable solid disposition in the molded part mold. More specifically clamping or screwing devices are possible embodiments of the fastening element.

In order to give stability to the mold insert, the mold insert can form a support structure.

In order to reduce weight or to obtain a certain heat insulation, the support structure can have hollow spaces.

In another embodiment, joined partial mold inserts form the mold insert. More specifically extensive mold parts such as carpet coverings in automobiles can thus be manufactured.

In order to form a mold insert with the partial mold inserts that is as homogeneous as possible, the partial mold inserts can have connection elements which can form a stable mold insert. Thereby, the connection elements can for instance be based on a type of groove and spring principle. Screw connections with matching threads can also be implemented.

In another aspect of the disclosure, the object can be solved by a device for manufacturing a molded part with a molded part mold with a cavity, which impresses onto an introduced material a shape, which is adapted to be disposed into the molded part mold after a previously described mold insert in such a manner that, when the mold insert is disposed, a volume-reduced cavity is formed which impresses a volume-reduced shape onto an introduced material. Molded parts which use the advantageous properties of the mold insert described above can thus be manufactured.

In order to ensure an optimal connection of the molded part mold and the mold insert, the volume reduced cavity can form a shape of the molded part to be manufactured, the size of the cavity formed by the molded part mold being increased by the thickness of the material of the mold insert.

In another embodiment the molded part mold has a matching receptacle for the fastening element. A detachable connection between the molded part mold and the mold insert can be ensured in this manner.

In order to provide alternatives with respect to the material of the molded part mold, the molded part mold can be made of a metal, more specifically stainless steel, steel, aluminum and/or magnesium or a metal alloy.

In order to form a cavity with a three dimensional shape, the molded part mold can have an upper part and an lower part, a mold insert being adapted to be disposed in the upper part as well as in the lower part or both.

In another aspect of the disclosure, the object is solved by a molded part, more specifically a molded foam part which has been manufactured by means of a device described above.

In another aspect of the disclosure, the object can be solved by a method for manufacturing a molded part, more specifically a molded foam part, the method comprising the following steps:
  Introducing a previously described mold insert into the molded part mold of previously described device,
  Injecting a moldable material, more specifically a foam into the volume-reduced cavity so that the volume-reduced cavity impresses the shape of the molded part onto the material in such a manner that a molded part is produced,
  Demolding the molded part,
  Removing the molded part In order to use the mold insert multiple times, other molded parts can be manufactured before removing the mold insert.

In another embodiment a coating layer, which is applied onto the molded part during manufacture, is applied to the mold insert before injecting the moldable material. Thus a molded part is provided which forms a firm connection with the coating layer. The molded part is thus protected from detrimental UV radiation for instance.

In order to manufacture assembled components, a molded part support, more specifically plastic support, can be introduced into the cavity or into the volume-reduced cavity before injecting the moldable material. Thereby one must merely take care that the molded part support can form a connection with the material in the cavity.

In another embodiment, the mold insert is exchanged with another mold insert after removing the molded part. Thus it is possible to dispense with exchanging the molded parts and to merely use the less expensive mold inserts.

In order to further reduce the costs a used mold insert can be cleaned and reused.

In an additional aspect of the disclosure, the object can be solved by a molded part which has been manufactured with the method described above.

In another aspect of the disclosure, the object is solved by a method for manufacturing a molded part, wherein the use of any type of release agent is avoided. Thus, the costs for release agents during manufacture of the molded part can be reduced. Release agents are all types of materials, fluids, powders or the like which are used during the manufacture of the molded part without being essential to the actual function of the molded part and which merely serve to improve demolding.

In a final aspect of the disclosure, the object can be solved by a molded part which is manufactured according to the afore-mentioned method.

In the following, the disclosure is explained in more detail based on exemplary embodiments.

DETAILED DESCRIPTION OF THE PREFERRED EMBODIMENT

Figure 1:
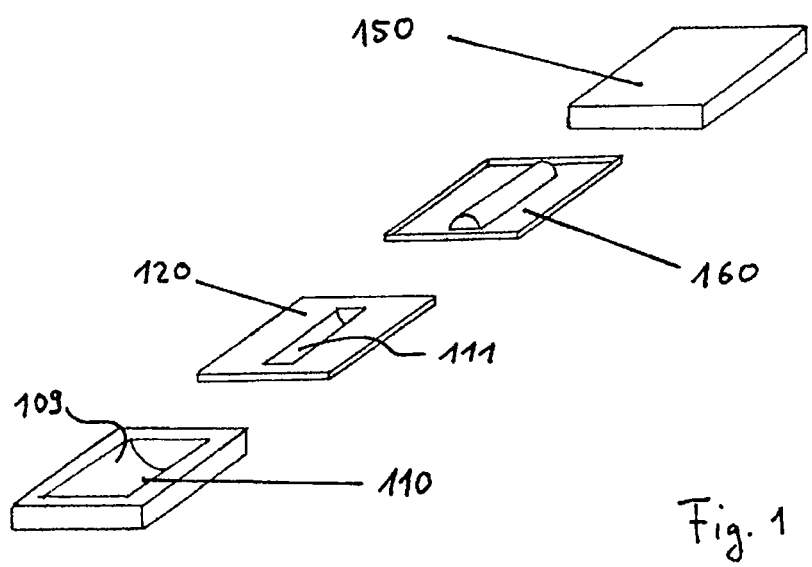
FIG. 1 shows a schematic representation of a tool with separated molded part molds and mold inserts for manufacturing a molded part.

A basic design of a tool according to the disclosure (FIG. 1) consists of a molded part mold (lower part) 110, a mold insert (lower part) 120 matching the molded part mold (lower part) 110 and a molded part mold (upper part) 150 with a mold insert (upper part) 160 matching the molded part mold (upper part) 150.

The molded part mold (lower part) 110 has a partial cavity 109. The same applies analogously to the molded part mold (upper part) 150 (not shown). When assembled, both partial cavities form a cavity. The mold insert (lower part) 120 has a volume-reduced partial cavity 111. The same applies to the mold insert (upper part) 160 (not shown). Both volume-reduced partial cavities form a volume-reduced cavity.

The molded part mold (lower part) 110 as well as the molded part mold (upper part) 150 are configured in such a manner that the matching mold inserts 120, 160 are form-fittedly received by the molded part molds 110, 150.

When the molded part mold (upper part) 150 and the molded part mold (lower part) 110 are assembled with the mold inserts 120, 150, the mold tool used for manufacturing a molded part is formed.

A tool 201 for manufacturing a molded foam part (FIG. 2*a*) fastened to a plastic mold support 220 comprises a molded part mold (upper part) 150 and a molded part mold (lower part) 110. The mold insert 120 is introduced into the molded part mold 110. The form-fit connection thus formed is secured with the clamp connection 240. A plastic support 220 is disposed in the molded part mold (upper part) 150. The molded foam part (not shown) is attached to this plastic molded part support 220 during manufacture. The assembled tool forms a volume-reduced cavity 222.

Figure 2:
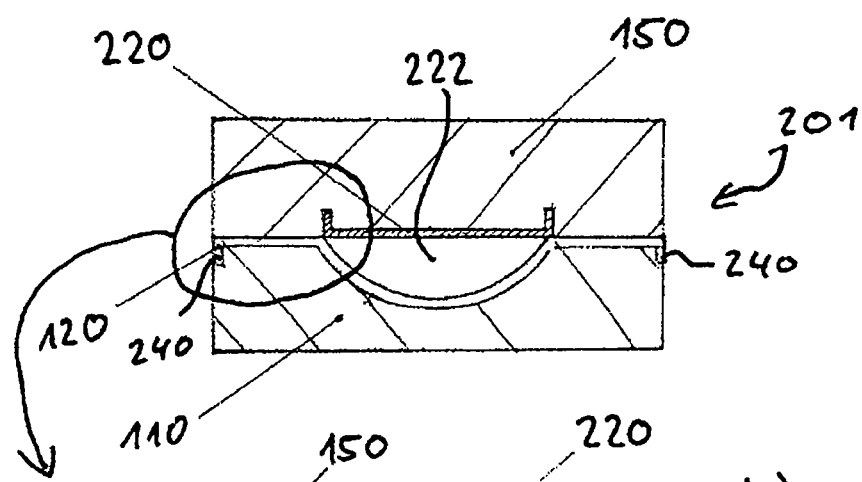
FIG. 2*a* shows a schematic representation of a cross-section through a tool for a molded foam part with a plastic molded part support.
FIG. 2*b* shows a magnified cut of FIG. 2*a* with a filled-in foam system and coating.
Figure 2:
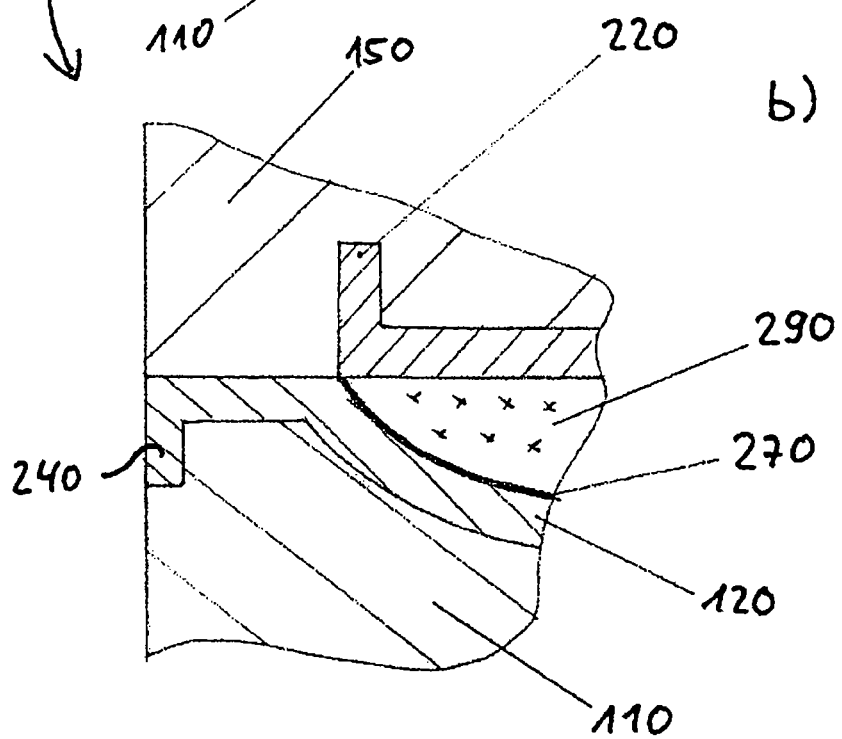

The mold insert 120 of the tool 201 is covered with a coating material for manufacturing a component with a plastic support, a molded foam part and a coating 270 covering the molded foam part (see FIG. 2b). The plastic molded part support 220 is introduced into the molded part mold 150. The molded part mold (upper part) 150 and the molded part mold (lower part) 110 with the matching mold insert 120 are closed. The foam system 290 is introduced into the volume-reduced cavity 222. The foam system 290 forms a firm connection with the coating 270 and the plastic molded part support 220. Since the mold insert 120 is made of polyethylene, no or very little coating 270 rests continue to adhere to the mold insert 120.

Figure 3:
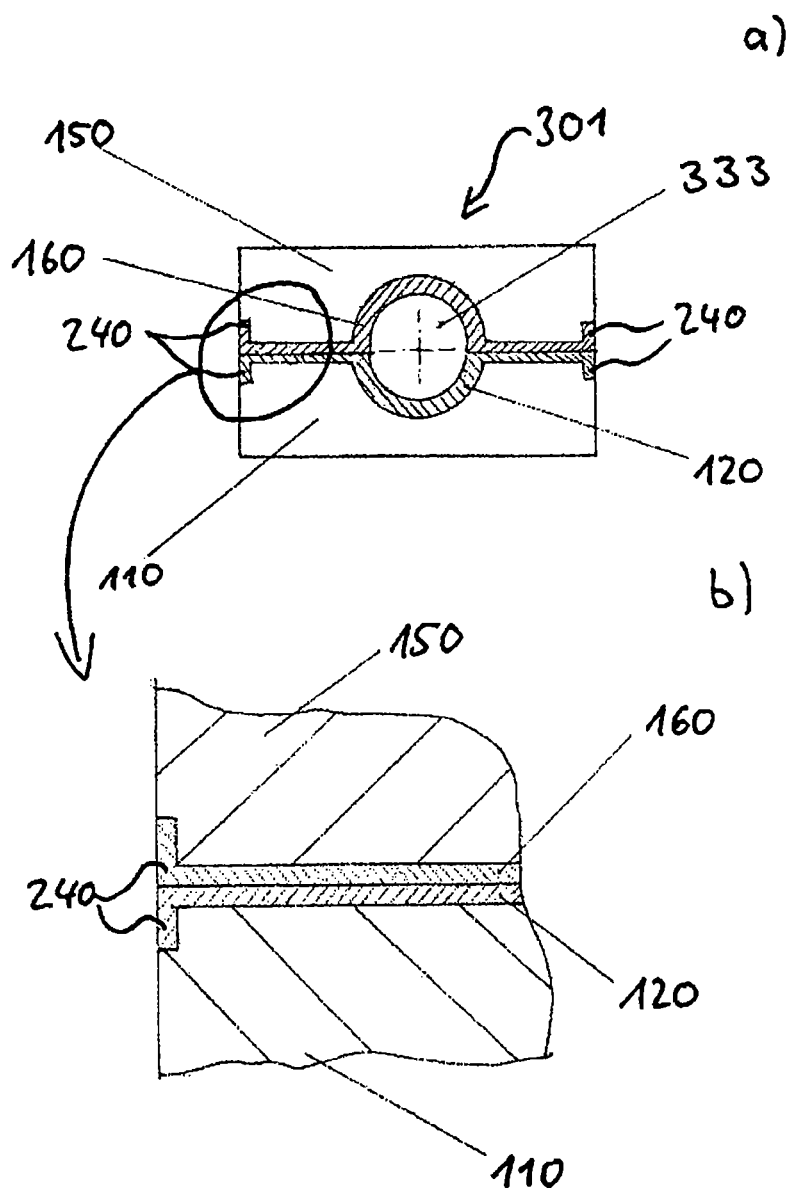
FIG. 3*a* shows a schematic representation of a cross-section through a tool for a molded foam part.
FIG. 3*b* shows a cut of the tool from FIG. 3*a*.

A molded foam part 333 is manufactured with the tool 301 (see FIGS. 3a and 3b). The mold insert (upper part) 160 as well as the mold insert (lower part) 120 are made of polyethylene. Both mold inserts 120, 160 are accurately fitted on the matching molded part molds 150 and 110. The clamping connections 240 ensure a sufficiently strong connection of the molded part molds 150, 110 with the mold inserts 120, 160. A foam is injected into the volume-reduced cavity 333 so that the molded foam part 333 is formed. Due to the choice of material for the mold inserts 120, 160, no residue of the molded part remains on the mold inserts 120, 160.

Figure 4:
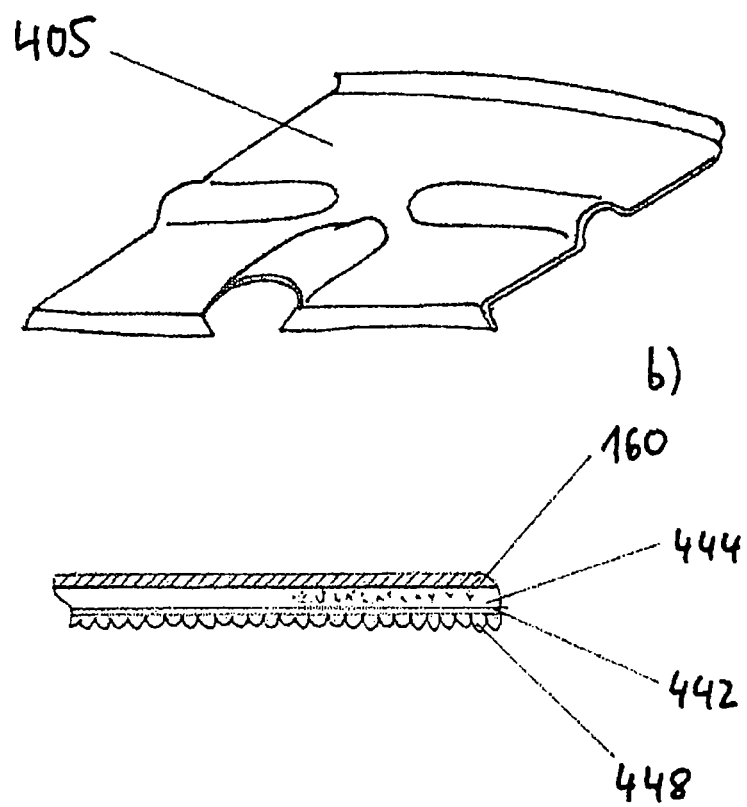
FIG. 4*a* shows a schematic representation of a thermoformed carpet for vehicle floors.
FIG. 4*b* shows a reduced schematic representation of a cross-section of a tool for manufacturing the thermoformed carpet from FIG. 4*a*.

Thermoformed carpets 405 for vehicle floors are manufactured with the mold insert 160 (see FIG. 4b). A tool like the one represented in a reduced size in FIG. 4b is used to this end. In principle, a carpet for vehicle floors comprises three layers. First a foam back 444, a carpet knitted base fabric 442 matched with this foam back 444 and the loop-pile material 448 which forms the actual carpet surface for the user. In the present disclosure, the loop-pile material 448 is made of velour. The molded part mold joined with the loop-pile material 448 is not shown. This molded part mold however limits the expansion possibilities of the carpet knitted base fabric 442 and of the loop-pile material 448. The cavity needed for the foam back 444 is formed by the mold insert (lower part) 160 which is made of polyethylene.

A foam is introduced into the cavity, so that a foam back 444 is formed, which forms a firm connection with the carpet knitted base fabric 442. Due to the choice of the material of the mold insert (lower part) 160, no residue of the foam back 444 remains on the mold insert (lower part) 160, so that the thermoformed carpet 405 for vehicle floors can be manufactured substantially without release agents.

Figure 5:
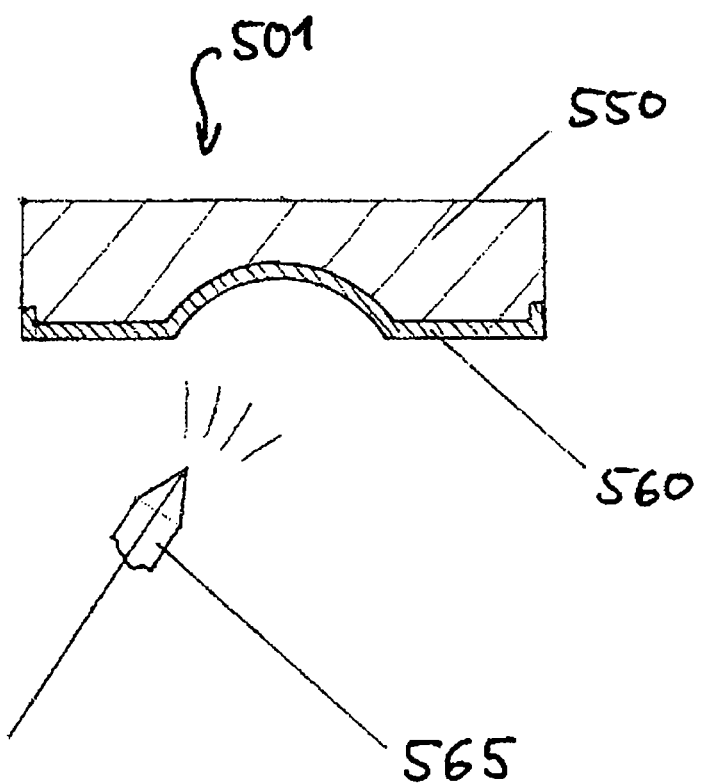
FIG. 5 shows a schematic representation of a galvano-mold tool for manufacturing spray skins.
Figure 6:
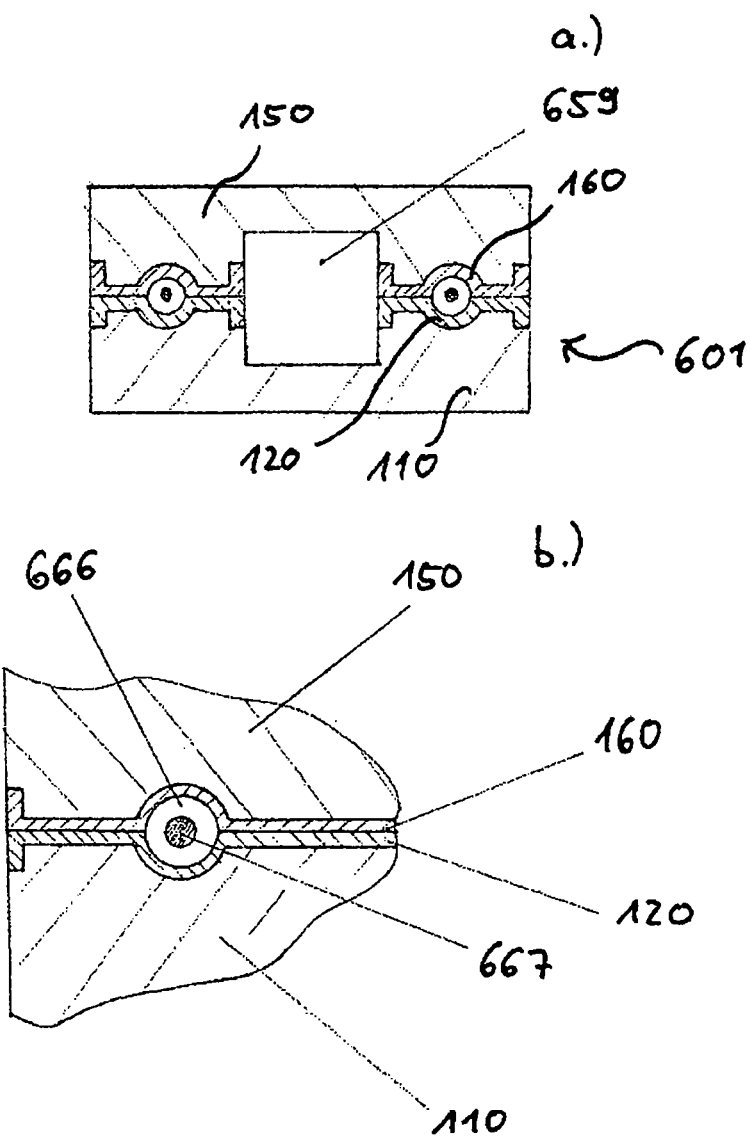
FIG. 6*a* shows a schematic representation of a cross-section through a tool for manufacturing a steering wheel and FIG. 6*b* shows a magnified cut of the tool from FIG. 6*a*.

Spray skins are manufactured with the tool 501 (see FIG. 5). The tool consists of a galvano-molded part mold (upper part) 550 and a matching galvano-mold insert (upper part) 560. The galvano-mold insert (upper part) 560 is sprayed with a two-component polyurethane system via a spraying nozzle 565. The galvano-mold insert (upper part) 560 made of polyethylene has a grain which impresses a leather-type structure onto the sprayed skin.

The spraying nozzle 565 distributes the polyurethane system in such a manner that in time, a thin skin forms on the surface of the galvano-mold insert (upper part) 560. This skin is pulled off the galvano-mold insert (upper part) 560 during demolding. Due to the choice of the material of the galvano-mold insert (upper part) 560, no residue of the manufactured skin remains on the galvano-mold insert.

A steering wheel is manufactured with the tool 601. The tool 601 has a molded part mold (upper part) 110 and a molded part mold (lower part) 150. These molded part molds 110, 150 each receive a mold insert 120, 160. The tool 601 additionally has a free space for the steering wheel hub 659. For stability reasons, a steering wheel core 667 is fastened in the tool 601 before introducing a foam. The foam system is injected into the formed volume-reduced cavity 666 in such a manner that the steering wheel is formed.

LIST OF REFERENCE SIGNS 109 partial cavity
110 molded part from the front (lower part)
111 volume-reduced partial cavity
120 mold insert (lower part)
150 molded part from the front (upper part)
160 mold insert (upper part)
201 tool for manufacturing a molded foam part attached to a plastic mold support
220 plastic molded part support
222 volume-reduced cavity
240 clamping connection
270 coating
290 foam system
301 tool for manufacturing a molded foam part
333 molded foam part
405 thermoformed carpet

What is claimed is:

1. A method for manufacturing a foam molded part without the use of release agents, the method-comprising:
   introducing a mold insert comprising an injection molded polyolefin into a molded part mold, wherein the molded part mold comprises an upper mold half and a lower mold half, wherein the upper mold half and lower mold half form a cavity having a shape when placed adjacent to each other, wherein the molded part mold is adapted to impress the shape of the cavity onto a material introduced into the cavity, wherein the mold insert comprises (a) an upper part, (b) a matching lower part, wherein the mold insert upper part and the mold insert matching lower part provide a reduced volume cavity shape, wherein the upper part and matching lower part are adapted to be disposed on matching surfaces of the upper mold half and lower mold half, respectively so that, when disposed on the matching surfaces of the upper mold half and lower mold half, the reduced volume cavity shape is formed by the mold insert, wherein the mold insert impresses the reduced volume cavity shape onto the injection molded polyolefin, wherein each of the upper part and lower matching part is comprised of the injection molded polyolefin having a thickness of between about 0.8 mm to about 8.0 mm, (c) a temperature conducting element disposed in each of the upper part and the matching lower part and (d) a fastening element associated with each of the upper part and matching lower part, wherein the fastening element provides a detachable connection for the upper part and the matching lower part to the upper mold half and lower mold half, respectively;
   disposing the upper mold half and lower mold half adjacent to each other so that the upper part and lower matching part are disposed adjacent to each other;
   injecting a hardenable and moldable material, without a release agent applied to either the upper part or lower matching part, into the reduced volume cavity, so that the reduced volume cavity impresses the shape of the reduced volume cavity onto the hardenable and moldable material;
   removing the mold insert with the hardenable and moldable material in the mold insert from the molded part mold;

allowing the hardenable and moldable material to harden outside of the molded part mold; and removing the hardened material from the mold insert.

2. The method according to claim 1, further comprising applying a coating layer onto the upper part and lower matching part before injecting the hardenable and moldable material.

3. The method according to claim 1, wherein one of the upper part or lower matching part comprises a plastic support.

4. The method according to claim 1, wherein after removing the mold insert and allowing the hardenable and moldable material to harden, another mold insert is introduced into the molded part mold.

5. The method according to claim 1, wherein a used mold insert is cleaned and reused.

6. The method according to claim 1, wherein the polyolefin is polyethylene.

7. The method according to claim 1, wherein the upper part and the lower matching part each has a thickness of about 2.5 mm.

8. The method according to claim 1, wherein the temperature conducting conductive element is comprised of metal.

\* \* \* \* \*